United States Patent [19]
Ishijima

[11] 3,790,792
[45] Feb. 5, 1974

[54] DEVICE FOR X-RAY ANALYSIS
[75] Inventor: Hiroshi Ishijima, Tokyo, Japan
[73] Assignee: Nihon Denshi Kabushiki Kaisha, Tokyo, Japan
[22] Filed: Aug. 30, 1972
[21] Appl. No.: 285,059

[52] U.S. Cl. .................................. 250/278, 250/274
[51] Int. Cl. ............................................ G01n 23/20
[58] Field of Search ..................... 250/49.5 PE, 51.5

[56] References Cited
UNITED STATES PATENTS
2,837,655  6/1958  Lang.................................. 250/51.5
3,119,013  1/1964  Wytzes et al. ..................... 250/51.5

Primary Examiner—William F. Lindquist
Attorney, Agent, or Firm—Webb, Burden, Robinson & Webb

[57] ABSTRACT

This specification discloses a device for X-ray analysis having a pulse height analyzer in which the window width of the analyzer is varied in proportion to $\sqrt{\sin\theta}$ in order to discriminate pulses attributable to the X-rays satisfying the Bragg equation.

5 Claims, 4 Drawing Figures

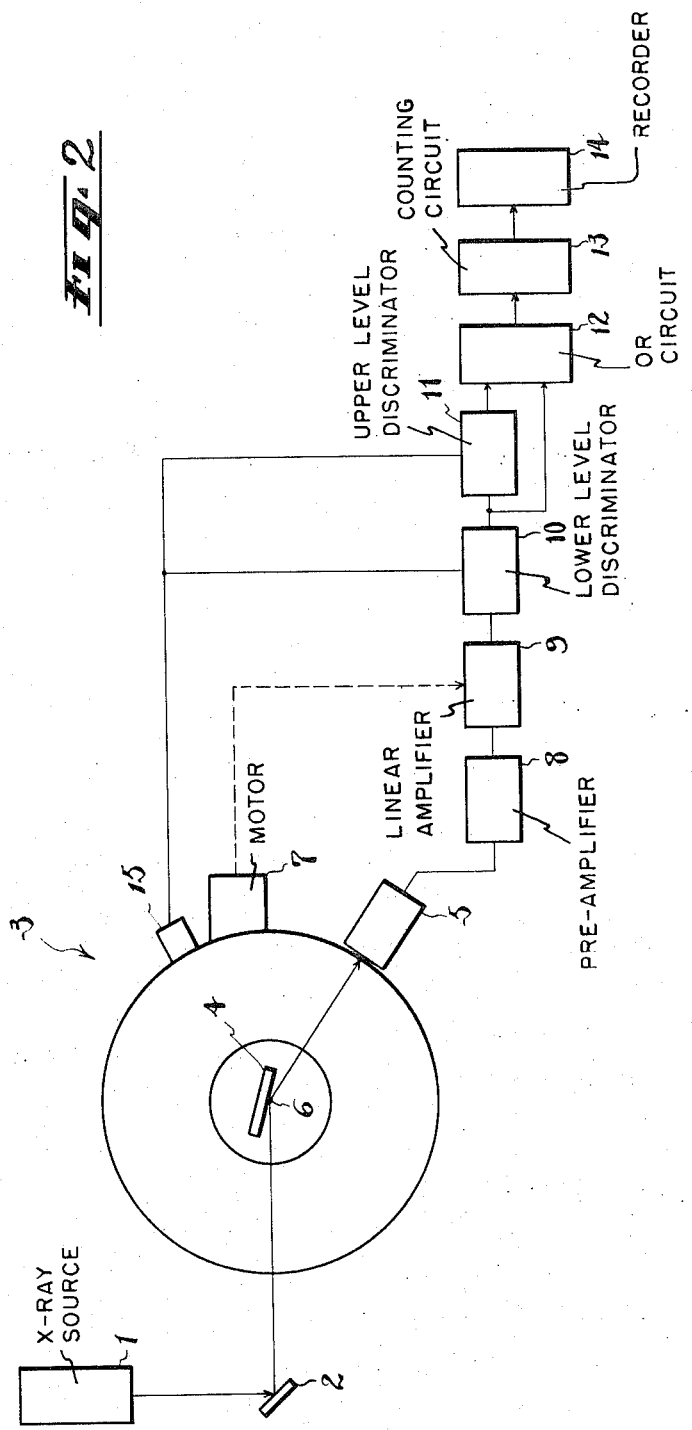

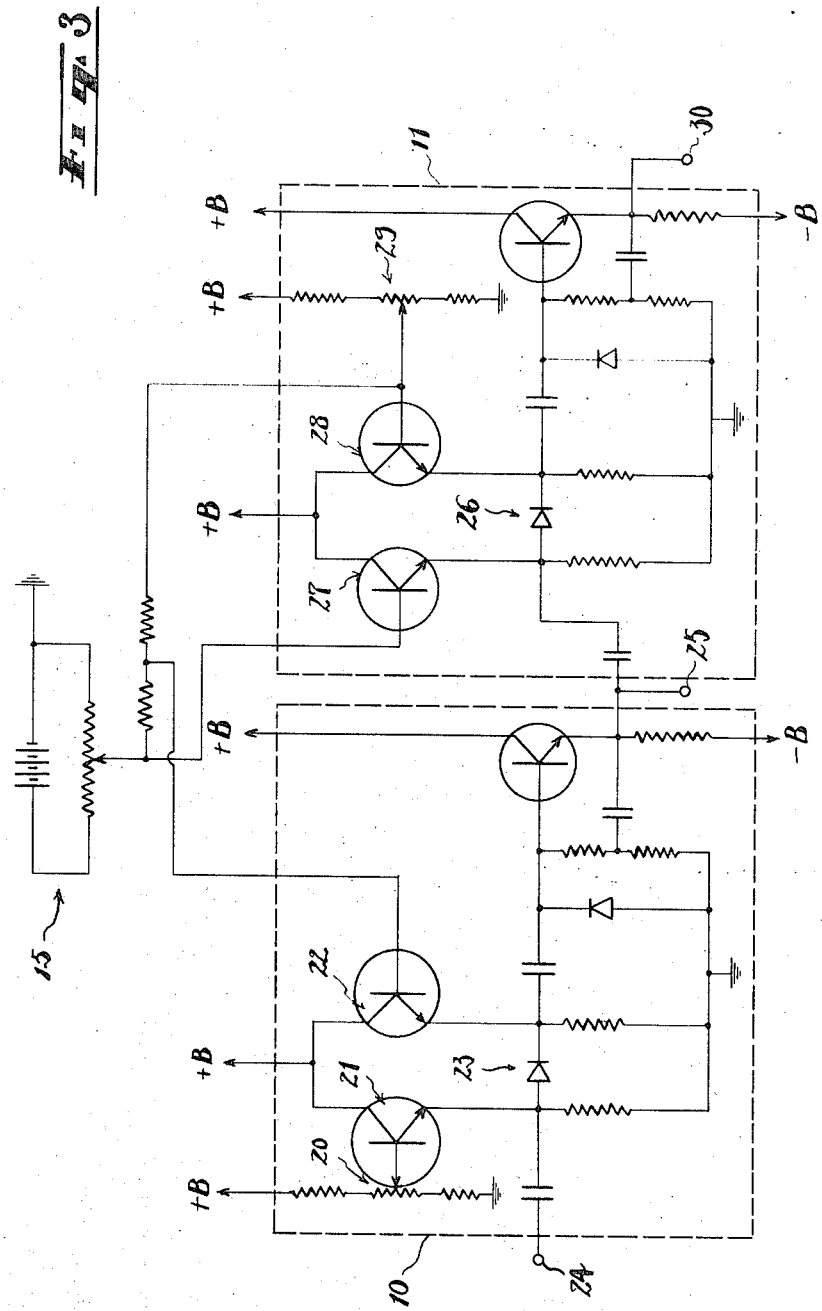

DEVICE FOR X-RAY ANALYSIS

This invention relates in general to an apparatus for X-ray analysis, and more particularly, it relates to an apparatus having a pulse height analyzer.

In an apparatus for X-ray analysis, for example, X-ray fluorescent analysis, X-rays radiated from a sample are diffracted by a single crystal according to the wavelength of the respective X-rays and reflected accordingly. Those X-rays reflected from the single crystal at an angle of $2\theta$ are detected by an X-ray counter such as a proportional or scintillation counter, the output signal of which is fed into a pulse height analyzer in order to eliminate noise components such as stray X-rays and second and third order reflections.

Prior to being applied to the pulse height analyzer whose base line level and window width are fixed, the output pulse height of the counter is adjusted so that the pulse height of the X-rays having a wavelength satisfying the Bragg equation remains constant even when the goniometer comprising the single crystal and the counter is rotated. The train of input pulses, upon entering the pulse height analyzer, are simultaneously applied to two discriminators (upper and lower) which pass the pulses according to their respective heights. To be more specific, pulses whose height extends beyond the upper level of the window width pass through the upper discriminator and pulses whose height extends beyond the base line of the window pass through the lower discriminator. The discriminator outputs are then applied to an exclusive OR circuit which generates a pulse at the instant a pulse from the lower discriminator enters said circuit. The pulses generated from the exclusive OR circuit are counted by a counter and recorded by a recorder.

The output pulses of X-rays having a given wavelength exhibit Gaussian distribution, the pulse height of the mean pulse of the distribution corresponding to said given wavelength. On FIG. 1, the shape of the pulse height distribution for three wavelengths corresponding to gold $K\alpha$ spectral lines ($AgK\alpha$), the copper $K\alpha$ spectral lines ($CuK\alpha$) and the titanium $K\alpha$ spectral lines ($TiK\alpha$) are super-imposed with adjusted mean pulse heights. Further, since it is a known fact that the energy resolution (half width value/mean pulse height) is varied by the energy difference of the X-rays, it is necessary to vary the base line level and the window width of the pulse height analyzer according to the wavelength of the X-rays satisfying the Bragg equation in order to be able to count only the pulses attributable to the X-rays satisfying the said equation. However, in the existing apparatus, since the base line level and window width are fixed, it is incapable of adequately discriminating between the wavelength of the X-rays. For example, if the window width is designed to pass X-rays having a long wavelength (low energy X-rays), said width will be too wide to prevent X-rays having a short wavelength (high energy X-rays) from passing through the pulse height analyzer minus their noise components. Again, if the window width is designed to pass X-rays having a short wavelength, said width will be too narrow to pass all the pulses attributable to the X-rays having a long wavelength, a portion of the pulses being intercepted by the pulse height analyzer. As a result, the SN ratio of the existing apparatus for X-ray analysis is low even when a pulse height analyzer is used.

Considering X-rays having a given wavelength, the pulse height distribution curves of the pulses converted by a counter exhibit Gaussian distribution as shown in FIG. 1 and the energy resolution R of these pulse height distribution curves is expressed as follows;

$$R = B/A \quad\quad (1)$$

where A is the voltage corresponding to the mean pulse height and B is the half width value. Further, $$R = k/\sqrt{E} = k/\sqrt{\hbar v} = k\sqrt{\lambda/\hbar c} \quad\quad (2)$$

where E is the energy of the X-ray, $\lambda$ is the wavelength, $v$ is the frequency, $\hbar$ is the Plank constant and $k$ is a constant. By substituting the Bragg equation $\lambda = 2d\sin\theta$, equation (2) can be rewritten as follows;

$$R = k\sqrt{2d\sin\theta\hbar c} = K\sqrt{\sin\theta} \quad\quad (3)$$

where $d$ is the lattice spacing of the crystal monochromator, $\theta$ is the angle at which the X-ray radiation is reflected from the lattice plane and K is a constant. Accordingly, by expressing equation (1) in terms of B and substituting $K\sqrt{\sin\theta}$ for R (equation(3)), B can be expressed as follows;

$$B = K\cdot A\sqrt{\sin\theta}$$

It will thus be appreciated from the above expression that the half width value B varies in proportion to $\sqrt{\sin\theta}$.

Briefly, according to one embodiment of this invention, the base line level in the pulse height analyzer is varied in proportion to A minus $KA\sqrt{\sin\theta}$ and the window width is varied in proportion to $2KA\sqrt{\sin\theta}$, providing a pulse height analyzer capable of passing only the pulses attributable to the X-rays satisfying the Bragg equation.

An object of this invention is to provide an apparatus for X-ray analysis having a high SN (signal to noise) ratio.

Another object of this invention is to provide an apparatus for X-ray analysis utilizing a pulse height analyzer in which the window width and the base line level are varied with the rotation of the goniometer.

Other objects and advantages of this invention will become readily apparent by reading the following detailed description in conjunction with the accompanying drawings in which;

FIG. 2 shows an apparatus for X-ray fluorscent analysis according to this invention.

FIG. 3 shows circuits of the two discriminators used in the apparatus shown in FIG. 2.

Figure 1:
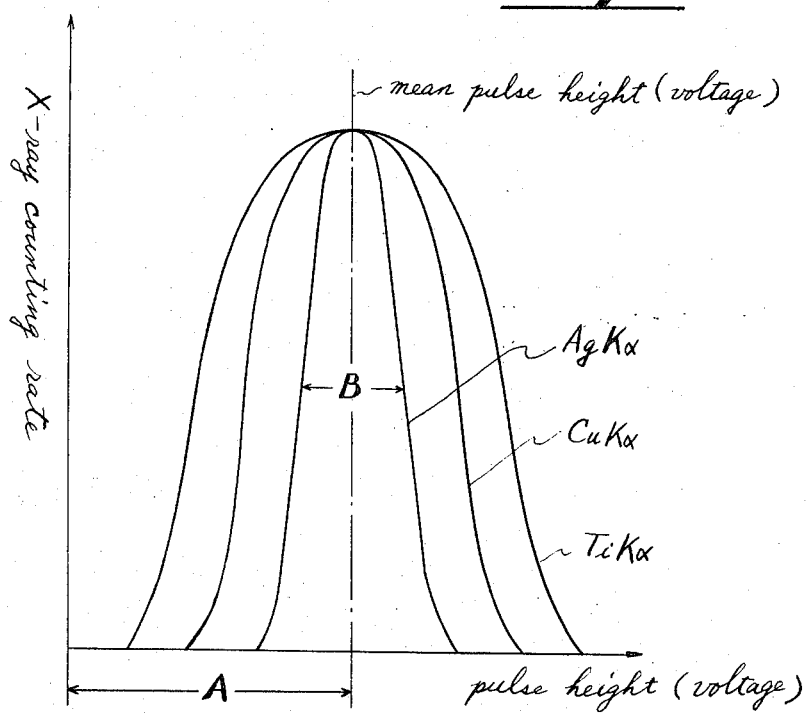
FIG. 1 shows pulse height distribution curves of output pulses of an X-ray counter.
Figure 4:
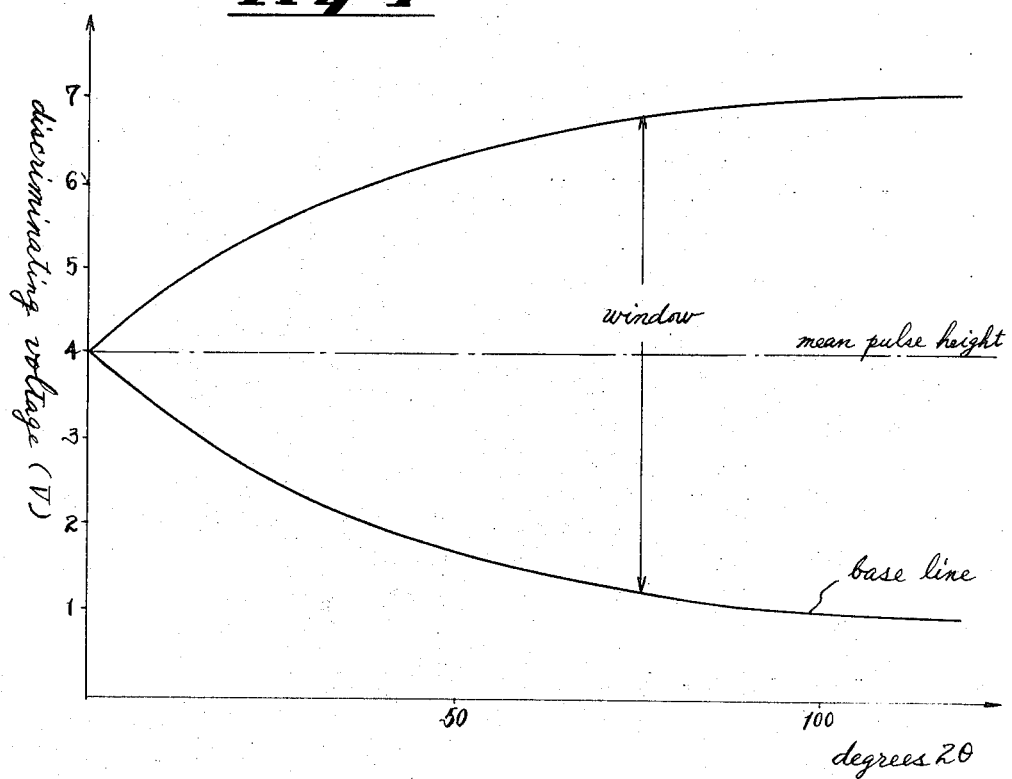

FIG. 4 shows the relationship between the goniometer rotation angle and the base line level and window width. Referring now to FIG. 2, X-rays generated by an X-ray generating tube 1 irradiate a sample 2 so as to radiate fluorescent X-rays from said sample. A portion of the fluorescent X-rays thus radiated enter a goniometer 3 comprising a rotatable crystal monochromator 4 and a rotatable X-ray counter 5 such as a porportional or scintillation counter. The monochromator 4 and the counter 5 are rotated about an axis 6 by a motor 7, the rotational speed of the counter being twice that of the monochromator. The fluorescent X-rays are diffracted by the monochromator and those X-rays having a wavelength satisfying the Bragg equation enter the counter. In this way, X-rays with different wavelengths enter the counter in sequence in accordance with the rotation of the goniometer.

The X-rays which enter the counter 5 are converted into electrical pulses, the height of the pulses being proportional to the wave-length of the X-rays. The pulse signals are amplified by a preamplifier 8 prior to entering a linear amplifier 9 whose gain is varied by a reference signal from the motor 7 in proportion to cosecant $\theta$ so as to make the mean pulse height of the pulses attributable to the X-rays satisfying the Bragg equation constant. A potentiometer that would enable such a reference signal is set forth in my copending application Ser. No. 285,058 filed of even date herewith entitled "Apparatus for X-ray Analysis." The output pulses from the linear amplifier 9 are then applied to a pulse height analyzer comprising a first (lower) discriminator 10, a second (upper) discriminator 11 and an exclusive OR circuit 12. Pulses whose height extends beyond the base line (lower limit voltage) pass through the first discriminator 10 and pulses whose height extends beyond the upper level of the window width (upper limit voltage) pass through the second discriminator 11. The output pulses of the two discriminators then enter the exclusive OR circuit 12 simultaneously. This circuit generates a pulse at the instant a pulse from the first discriminator 10 only enters it. The pulses, thus generated, are then counted by a counting circuit 13 and recorded by a recorder 14.

In the above arrangement, the output voltage of a potentiometer 15 which is varied by the rotation of the goniometer 3 and is proportional to $\sqrt{\sin\theta}$ is applied to the first and second discriminators. A potentiometer that would enable such an output voltage signal is disclosed in my copending application Ser. No. 285,058 filed of even date herewith entitled "Apparatus for X-ray Analysis." In addition, each discriminator produces a reference voltage, the difference between the potentiometer output voltage and the respective reference voltages being the discriminating voltage.

Referring now to the discriminator circuits shown in FIG. 3. The first discriminator 10 which determines the base line level comprises two transistors 21 and 22, a diode 23 and a reference voltage source 20. The reference voltage generated by the source 20 and half the voltage generated by the potentiometer 15 determine the potential difference across the diode 23. The discriminating voltage (base line) of the first discriminator is determined by the voltage difference between the threshold voltage of the diode 23 and the potential difference across the diode 23. The train of pulses entering the first discriminator through an input terminal 24 connected to the linear amplifier 9 are discriminated by the diode 23. That is to say, pulses whose height extends beyond the base line pass through the diode 23 and are applied to an output terminal 25 connected to the exclusive OR circuit 12 and to the second discriminator 11. The second discriminator 11 comprises two transistors 27 and 28, a diode 26 and a reference voltage source 29 etc. The reference voltage generated by the source 29 and the voltage generated by the potentiometer 15 determine the potential difference across the diode 26. The discriminating voltage (upper limit of the window width) of the second discriminator is determined by the voltage difference between the threshold voltage of the diode 26 and the potential difference across the diode 26. The train of pulses entering the second discriminator 11 from the first discriminator 10 are discriminated by the diode 26. That is to say, pulses whose height extends beyond the upper limit of the window width pass through the diode 26 and are applied to the exclusive OR circuit 12 via an output terminal 30. The exclusive OR circuit generates a pulse at the instant a pulse from the output terminal 25 only enters said circuit. In other words, at the instant no pulse from the output terminal 30 enters said circuit.

In the above described circuits, when the voltage generated by the potentiometer 15 is decreased by the rotation of the goniometer 3, since the potential difference across the diode 23 is decreased and the potential difference across the diode 26 is increased, the base line is lowered and the upper limit of the window width is raised, thereby increasing the window width. The relationship between the base line level and window width with respect to the goniometer rotation angle is shown in FIG. 4. Taking the mean pulse height (voltage) as the median voltage, the window width is increased exponentially by rotating the counter arm of the goniometer.

Having thus described the invention with the detail and particularity as required by the Patent Laws what is desired protected by letters Patent is set forth in the following claims.

What is claimed is:

1. An apparatus for X-ray analysis comprising:
   a. a crystal monochromator for diffracting X-rays radiated from a sample,
   b. an X-ray counter for converting the diffracted X-rays into pulses whose height corresponds to the wavelengths of the X-rays entering said counter,
   c. means for rotating said crystal monochromator and said X-ray counter on a common axis, the rotation speed of said crystal monochromator being one-half the speed of said X-ray counter,
   d. means for controlling the pulse height of said pulses produced by said X-ray counter, the mean pulse height of the pulses attributable to the X-rays satisfying the Bragg equation being maintained constant, and
   e. a pulse height analyzer for analyzing the controlled pulses, in which the base line and window width are varied such that said window width is in proportion to $\sqrt{\sin\theta}$, $\theta$ being the incident angle of the X-rays with respect to said crystal monochromator.

2. An apparatus according to claim 1 in which the pulse height is attenuated by an amplifier having a gain proportional to cosecant $\theta$.

3. An apparatus according to claim 1 wherein said pulse height analyzer comprises two discriminators and an exclusive OR circuit connected to said discriminators, first discriminator passing pulses whose height extends beyond the base line, the second discriminator passing pulses whose height extends beyond the upper level of the window.

4. An apparatus according to claim 3 wherein the first discriminator passes pulses whose pulse height exceeds A minus KA $\sqrt{\sin\theta}$ and the second discriminator passes pulses whose pulse height exceeds 2KA $\sqrt{\sin\theta}$ above the minimum pulse height passed by the first discriminator where A and K are constants and $\theta$ is the incident angle of the X-rays with respect to said crystal monochromator.

5. An apparatus for X-ray analysis comprising:

a. a crystal monochromator for diffracting X-rays radiated from a sample,
b. an X-ray counter for converting the diffracted X-rays into pulses whose height corresponds to the wavelengths of the X-rays entering said counter,
c. means for rotating said crystal monochromator and said X-ray counter on a common axis, the rotation speed of said crystal monochromator being one-half the speed of said X-ray counter,
d. means for controlling the pulse height of said pulses produced by said X-ray counter to be proportional to cosecant $\theta$, $\theta$ being the incident angle of the X-rays with respect to crystal monochromator, the said mean pulse height of the pulses corresponding to the X-rays satisfying the Bragg equation thereby being maintained substantially constant; and
e. a pulse height analyzer for analyzing the pulses comprising two discriminators and an exclusive OR circuit connected to said discriminators, said first discriminator passing pulses whose pulse height exceeds A minus $KA\sqrt{\sin\theta}$ and the said second discriminator passing pulses whose pulse height exceeds $2KA\sqrt{\sin\theta}$ above the minimum pulse height passed by the first discriminator where A and K are constants.

* * * * *

UNITED STATES PATENT OFFICE
CERTIFICATE OF CORRECTION

Patent No. 3,790,792          Dated February 5, 1974

Inventor(s) Hiroshi Ishijima

It is certified that error appears in the above-identified patent and that said Letters Patent are hereby corrected as shown below:

After the line listing the application serial number insert the following:

--Foreign Application Priority Data
September 10, 1971 Japan 46-70240--.

Signed and sealed this 10th day of September 1974.

(SEAL)
Attest:

McCOY M. GIBSON, JR.
Attesting Officer

C. MARSHALL DANN
Commissioner of Patents